US012719165B2

(12) United States Patent
Chen et al.

(10) Patent No.: US 12,719,165 B2
(45) Date of Patent: Aug. 25, 2026

(54) ANTENNA UNIT, ARRAY, BEAM SCANNNG METHOD, COMMUNICATION APPARATUS, AND STORAGE MEDIUM

(71) Applicant: Beijing Xiaomi Mobile Software Co., Ltd., Beijing (CN)

(72) Inventors: Dong Chen, Beijing (CN); Liangang Chi, Beijing (CN); Rui Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/712,185

(22) PCT Filed: Nov. 23, 2021

(86) PCT No.: PCT/CN2021/132575

§ 371 (c)(1),
(2) Date: May 21, 2024

(87) PCT Pub. No.: WO2023/092306

PCT Pub. Date: Jun. 1, 2023

(65) Prior Publication Data

US 2025/0030160 A1 Jan. 23, 2025

(51) Int. Cl.

*H01Q 3/36* (2006.01)
*H01P 1/18* (2006.01)
*H01Q 9/04* (2006.01)

(52) U.S. Cl.

CPC ............... *H01Q 3/36* (2013.01); *H01P 1/184* (2013.01); *H01Q 9/0407* (2013.01)

(58) Field of Classification Search

CPC .......... H01Q 3/36; H01Q 9/0407; H01Q 1/38; H01Q 1/50; H01Q 3/38; H01Q 21/00; H01Q 21/06; H01Q 21/065; H01P 1/184

See application file for complete search history.

(56) References Cited

U.S. PATENT DOCUMENTS 6,377,217 B1 4/2002 Zhu et al.
10,884,308 B2 * 1/2021 Cao .......................... H01Q 1/48

FOREIGN PATENT DOCUMENTS

CN 103975483 A 8/2014
CN 107046176 A 8/2017

(Continued)

OTHER PUBLICATIONS

Yizhe Zhao et al. "A frequency and pattern reconfigurable antenna array based on liquid crystal technology" IEEE Photonics Journal, DOI 10.1109/JPHOT.2017.2700042 2017.

(Continued)

*Primary Examiner* — Seung H Lee
(74) *Attorney, Agent, or Firm* — Volpe Koenig

(57) ABSTRACT

Disclosed are an antenna unit, an antenna array, a beam scanning method, a communication apparatus, and a computer-readable storage medium. The antenna unit includes a microstrip patch antenna and a phase shifter. The phase shifter includes: a microstrip line; a liquid crystal layer, arranged between the microstrip line and the microstrip patch antenna; and a metal layer, arranged between the liquid crystal layer and the microstrip patch antenna, where a first through hole is formed in the metal layer, and the output ends of the microstrip patch antenna and the microstrip line are coupled by means of the first through hole. The antenna unit capable of implementing beam phase change is simple in structure, low in manufacturing cost, and small in weight, can be manufactured into a planar structure, and is low in profile, easy to process, easy to downsize, convenient to carry, and convenient to integrate.

13 Claims, 8 Drawing Sheets

(56) References Cited

FOREIGN PATENT DOCUMENTS

| | | | |
|---|---|---|---|
| CN | 108666738 | A | 10/2018 |
| CN | 110350325 | A | 10/2019 |
| CN | 110690556 | A | 1/2020 |
| CN | 111769359 | A | 10/2020 |
| CN | 112490672 | A | 3/2021 |
| CN | 113219688 | A | 8/2021 |
| CN | 113659333 | A | 11/2021 |

OTHER PUBLICATIONS

Xiaoyu Li et al, "Broadband Electronically Scanned Reflectarray Antenna With Liquid Crystals" IEEE Antennas and Wireless Propagation Letters, vol. 20, No. 3, Mar. 2021.

Dianmin LIN et al., "Dielectric gradient metasurface optical elements", Science vol. 345, 298; Issue 6194 (Jul. 18, 2014) DOI: 10.1126/science.1253213.

Chang Jiang You et al. "Frequency Continuously Tunable Patch-Slot Antenna With Wide-Angle Discrete Scanning and Optional Backward Radiation" IEEE Antennas and Wireless Propagation Letters, vol. 20, No. 4, Apr. 2021.

Liang Wei WU et al. "High-transmission ultrathin huygens' metasurface with 360 phase control by using double-layer transmitarray elements" Physical Review Applied 12, 024012 (2019) DOI: 10.1103/PhysRevApplied.12.024012.

Yu et al., "Design of a new low cost planar phased array antenna basedon liquid crystal phase shifting technology", China Academic Journal Electronic Publishing house, 1994-2023, 3 pages (English Abstract only).

* cited by examiner

ANTENNA UNIT, ARRAY, BEAM SCANNNG METHOD, COMMUNICATION APPARATUS, AND STORAGE MEDIUM

CROSS-REFERENCE TO RELATED APPLICATIONS

The present application is a U.S. National Stage of International Application No. PCT/CN2021/132575, filed on Nov. 23, 2021, the contents of all of which are incorporated herein by reference in their entirety for all purposes.

BACKGROUND OF THE INVENTION

In non-terrestrial networks (NTN), terminals may communicate with base stations through satellites. The satellites mainly include high-orbit satellites and low-orbit satellites. The high-orbit satellites are typically located at an altitude of 35,800 kilometers from the ground and are stationary with respect to the Earth's orbit. When the terminals communicate with the satellites via beams, the beams are aimed at the satellites merely for the first time.

SUMMARY OF THE INVENTION

According to a first aspect of examples of the disclosure, there is provided an antenna unit, including a microstrip patch antenna and a phase shifter; where the phase shifter includes: a microstrip line; a liquid crystal layer, arranged between the microstrip line and the microstrip patch antenna; and a metal layer, arranged between the liquid crystal layer and the microstrip patch antenna; a first through hole is formed in the metal layer, and the microstrip patch antenna and the output end of the microstrip line are coupled via the first through hole.

According to a second aspect of the examples of the disclosure, there is provided an antenna array, including the above-mentioned antenna unit.

According to a third aspect of the examples of the disclosure, there is provided a beam scanning method, applicable to the antenna array, and including: adjusting the dielectric constant of the liquid crystal layer by controlling an electrical signal on the metal layer and/or an electrical signal on the microstrip line in each of the antenna units; where the electric signal on the microstrip line is phase-shifted by the liquid crystal layer and then coupled to the microstrip patch antenna for radiation, and after the phases of the signals radiated by the microstrip patch antennas in a plurality of the antenna units are superimposed, a beam emitted in a target direction is formed.

According to a fourth aspect of examples of the disclosure, there is provided a communication apparatus, including: the antenna array described above, and a processor, and a memory for storing a computer program; where the computer program, when executed by the processor, implements the beam scanning method described above.

According to a fifth aspect of the examples of the disclosure, there is provided a computer-readable storage medium for storing a computer program, where the computer program, when executed by a processor, implements the step in the above-mentioned beam scanning method.

BRIEF DESCRIPTION OF DRAWINGS

In order to illustrate the technical solutions in the examples of the disclosure more clearly, the accompanying drawings needed to be used in the description of the examples will be briefly introduced below, it is apparent that the accompanying drawings in the following description are merely some examples of the disclosure, and other drawings can be obtained according to these drawings for a person having ordinary skill in the art without paying inventive step.

DETAILED DESCRIPTION OF THE INVENTION

Figure 1A:
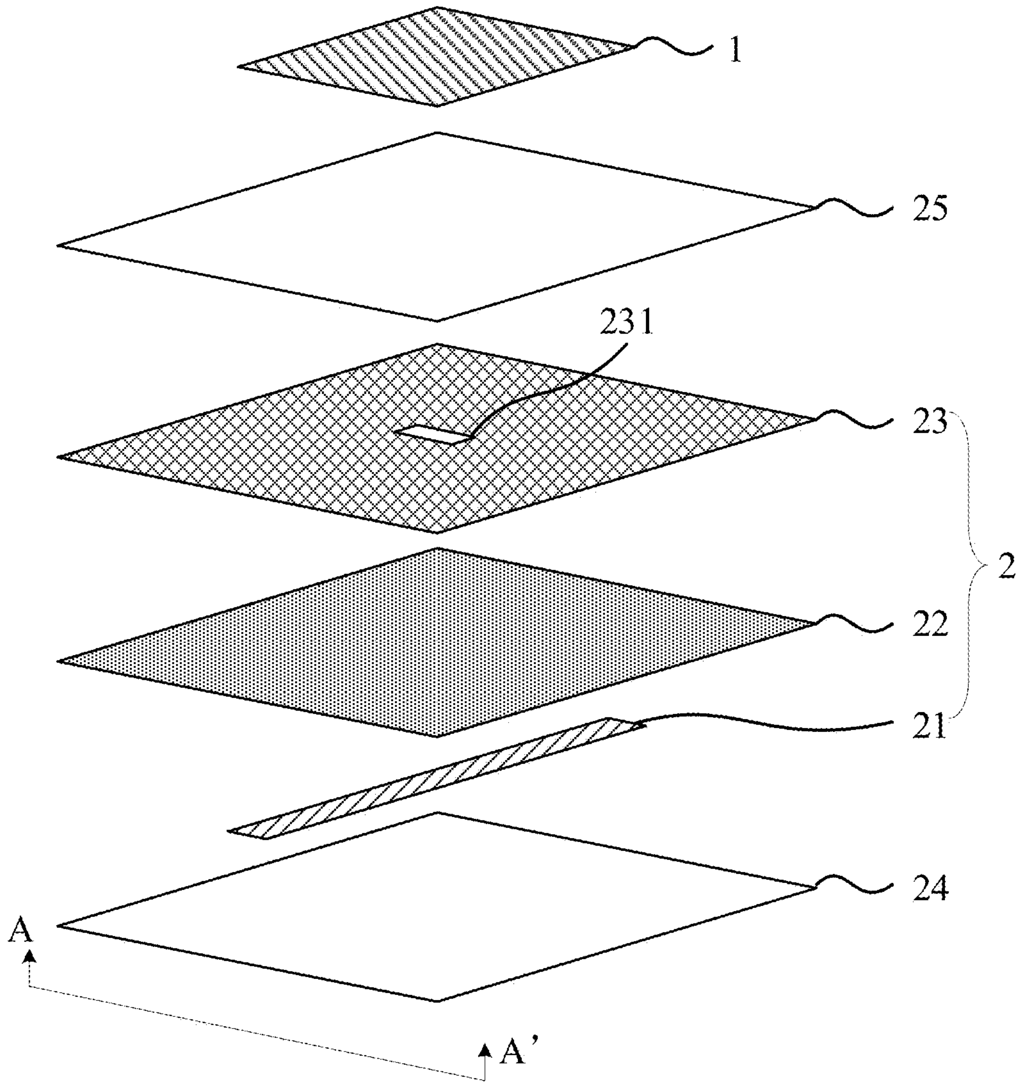
FIG. 1A is a layered structural schematic diagram of an antenna unit according to an example of the disclosure.

The technical solutions in the examples of the disclosure will be clearly and completely described below in conjunction with the accompanying drawings in the examples of the disclosure, and it is apparent that the described examples are merely a part of the examples of the disclosure, rather than all of the examples. Based on the examples in the disclosure, all other examples obtained by a person having ordinary skill in the art without making inventive labor, belong to the scope of protection of the disclosure.

The terminology used in the examples of the disclosure is merely for the purpose of describing specific examples and is not intended to limit the examples of the disclosure. As used in examples of the disclosure and the appended claims, the singular forms "a," "an," and "the" are intended to include the plural forms as well, unless the context clearly indicates otherwise. It will also be understood that the term "and/or" as used here refers to and encompasses any and all possible combinations of one or more of the associated listed items.

It needs to be understood that although the terms such as first, second and third may be used to describe various information in the example of the disclosure, this information needs to not be limited to these terms. These terms are merely used to distinguish the same type of information from one another. For example, first information may also be referred to as second information, and, similarly, second information may also be referred to as first information, without departing from the scope of examples of the disclosure. Depending on the context, the word "if" as used here may be interpreted as "upon," "when," or "in response to determining".

For the purpose of conciseness and easy understanding, the terms used in the disclosure are "greater than," "less than," "higher than," or "lower than". But for those skilled in the art, it may be understood that the term "greater than" also covers the meaning of "greater than or equal to", and the term "less than" also covers the meaning of "less than or equal to"; the term "higher than" covers the meaning of "higher than or equal to," and the term "lower than" also covers the meaning of "lower than or equal to."

The disclosure relates to the technical field of communication, in particular to an antenna unit, an antenna array, a beam scanning method, a communication apparatus, and a computer-readable storage medium.

In non-terrestrial networks (NTN), terminals may communicate with base stations through satellites. The satellites mainly include high-orbit satellites and low-orbit satellites. The high-orbit satellites are typically located at an altitude of 35,800 kilometers from the ground and are stationary with respect to the Earth's orbit. When the terminals communicate with the satellites via beams, the beams are aimed at the satellites merely for the first time.

However, since the high-orbit satellites are located in an orbit far from the ground, the antenna gain needed for communication is high, typically above 30 dB. The antennas used are generally parabolic antennas, which are not easy to integrate due to their high profile and large size. For example, the cost of launching the high-orbit satellites is also high, and hidden security risks exist.

Low-orbit satellites can avoid the above problems to a great extent. Generally, low-orbit satellites are located in the air from 200 km to 2,000 km above the ground, and because low-orbit satellites are close to the ground, the launch cost is greatly reduced, and low-orbit satellites also have more suitable effective isotropic radiated power (EPIR) and G/T.

However, because the low-orbit satellite moves in its orbit, it is impossible for the low-orbit satellite to be stationary relative to the Earth's orbit, which requires the terminal to constantly adjust the beam direction to aim at the moving satellite in order to communicate well with the satellite.

Figure 1B:
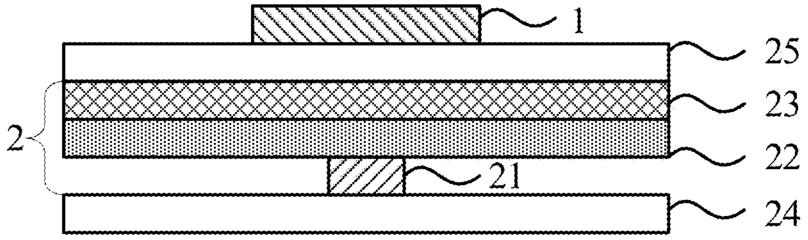
FIG. 1B is a schematic cross-sectional view of the antenna unit shown in FIG. 1A along direction AA'.

FIG. 1A is a layered structural schematic diagram of an antenna unit according to an example of the disclosure, and FIG. 1B is a schematic cross-sectional view of the antenna unit shown in FIG. 1A along direction AA'. The antenna unit shown in this example may be applied to terminals including but not limited to communication apparatuses such as cell phones, tablet computers, wearable devices, sensors, and Internet of Things devices. The terminal may communicate with a network-side device including, but not limited to, a network-side device in 4G, 5G, and 6G communication systems, such as a base station and a core network.

As shown in FIGS. 1A and 1B, the antenna unit includes a microstrip patch antenna 1 and a phase shifter 2; where the phase shifter 2 includes: a microstrip line 21; a liquid crystal layer 22, arranged between the microstrip line 21 and the microstrip patch antenna 1; and a metal layer 23, arranged between the liquid crystal layer 22 and the microstrip patch antenna 1; where the material of the metal layer includes but is not limited to metallic copper; a first through hole 231 is formed in the metal layer 23, and the microstrip patch antenna 1 and the output end of the microstrip line 21 are coupled via the first through hole 231. The shape of the through hole may be set as needed. For example, the through hole may be a rectangular through hole as shown in the figure, and may also be set as other shapes as needed, such as an oval through hole and a diamond through hole.

In one example, the terminal may be a terminal in a non-terrestrial network, and may communicate with satellites in the non-terrestrial network through beams. At present, in order to aim the emitted beam at the satellite when the terminal communicates with the satellite, phased array technology or a micro electromechanical system (MEMS) is mainly used to set the beam emitting antenna in the terminal, but the antenna structure based on these technologies is relatively complex, with high cost and great loss.

In one example, the dielectric constant of the liquid crystal in the liquid crystal layer is variable. For example, by adjusting the electrical signals (e.g., voltage) on both sides of the liquid crystal layer, the dielectric constant of the liquid crystal can be changed. For example, the range of the dielectric constant is 2.4 to 3.2.

In one example, the microstrip line, the liquid crystal layer and the metal layer can form the phase shifter. By inputting a signal (such as a radio frequency signal) to the microstrip line, the output end of the microstrip line is coupled to the microstrip patch antenna via the first through hole in the metal layer, and the microstrip patch antenna can further emit the coupled signal. For example, in the form of a beam.

Based on the structure shown in this example, the beam emitted by the antenna unit is linearly polarized wave, and other polarized waves such as circularly polarized wave and elliptically polarized wave can also be emitted by adjusting the structure (e.g., adjusting the structure of microstrip line and the metal layer) as needed. The structure of the microstrip patch antenna may be a metasurface patch.

In the process of coupling the signal on the microstrip line to the microstrip patch antenna, the signal will first pass through the liquid crystal layer, which can change the phase of the signal and thus function as a phase shifter.

Moreover, the liquid crystal layer exhibits different amplitudes of signal phase change under different dielectric constants. The voltage difference on both sides of the liquid crystal layer is changed by controlling the telecommunication signals on the metal layer, for example, transmitting a voltage signal to the metal layer through a flexible flat cable of a flexible printed circuit (FPC), or by controlling the electrical signal on the microstrip line, or by controlling the electrical signals on the metal layer and the microstrip line, so as to change the dielectric constant of the liquid crystal in the liquid crystal layer and change the dielectric constant of the liquid crystal layer, so that the degree of change of the phase shifter for the phase of the signal on the microstrip line is adjusted. Accordingly, the phase of the beam emitted by the microstrip patch antenna in the antenna unit can be controlled, that is, the structure of this example can realize 360-degree full-phase high-precision phase shift.

In this example, the antenna unit capable of implementing beam phase change is simple in structure, low in manufacturing cost, and small in weight, can be manufactured into a planar structure, and is low in profile, easy to process, easy to downsize, convenient to carry, and convenient to integrate.

Further, a plurality of antenna units can be made into an antenna array as needed, where the phases of radio frequency signals emitted by all the antenna units may be all the same, partially the same, or all different. On this basis, by adjusting the dielectric constant of the liquid crystal layer in each antenna unit, the electrical signal on the microstrip line in each antenna unit can be phase-shifted to different degrees through the liquid crystal layer, and then coupled to the microstrip patch antenna for radiation. After the phases of the signals radiated by the microstrip patch antennas in the plurality of antenna units are superimposed, a beam emitted in the target direction is formed, thus realizing the control over the direction of the beam emitted by the antenna array.

Due to the simple structure of antenna units, the antenna array composed of the antenna units is relatively simple in structure, easy to reconstruct, and convenient for controlling the beam direction, so as to control the beam to be aimed at the satellite in real time and ensure good signal quality in communication with the satellite.

In one example, the antenna unit further includes: a substrate 24, where the microstrip line is arranged on the substrate; and a dielectric layer 25, arranged between the metal layer and the microstrip patch antenna.

In one example, the microstrip line may be formed on the substrate, then the liquid crystal layer may be arranged on the layer where the microstrip line is located, then the metal layer may be formed on the liquid crystal layer, then the dielectric layer may be arranged on the metal layer, and finally the microstrip patch antenna may be formed on the dielectric layer. The dielectric layer can play a role in insulating the metal layer from the microstrip patch antenna.

In one example, the substrate and the dielectric layer may be glass. For example, glass of model BF33, so as to improve good support for the structure of each layer in the antenna unit.

In one example, the microstrip patch antenna may be formed on the upper surface of the dielectric layer by micro-nano processing technology, then the metal layer may be formed on the lower surface of the dielectric layer, the microstrip line may be formed on the substrate, then a liquid crystal alignment material is spun between the microstrip line and the metal layer to fill the space between the microstrip line and the metal layer with liquid crystal, and finally, gluing and encapsulation are performed to form an antenna unit. The microstrip line and the microstrip patch antenna may share the metal layer as the ground.

Figure 2A:
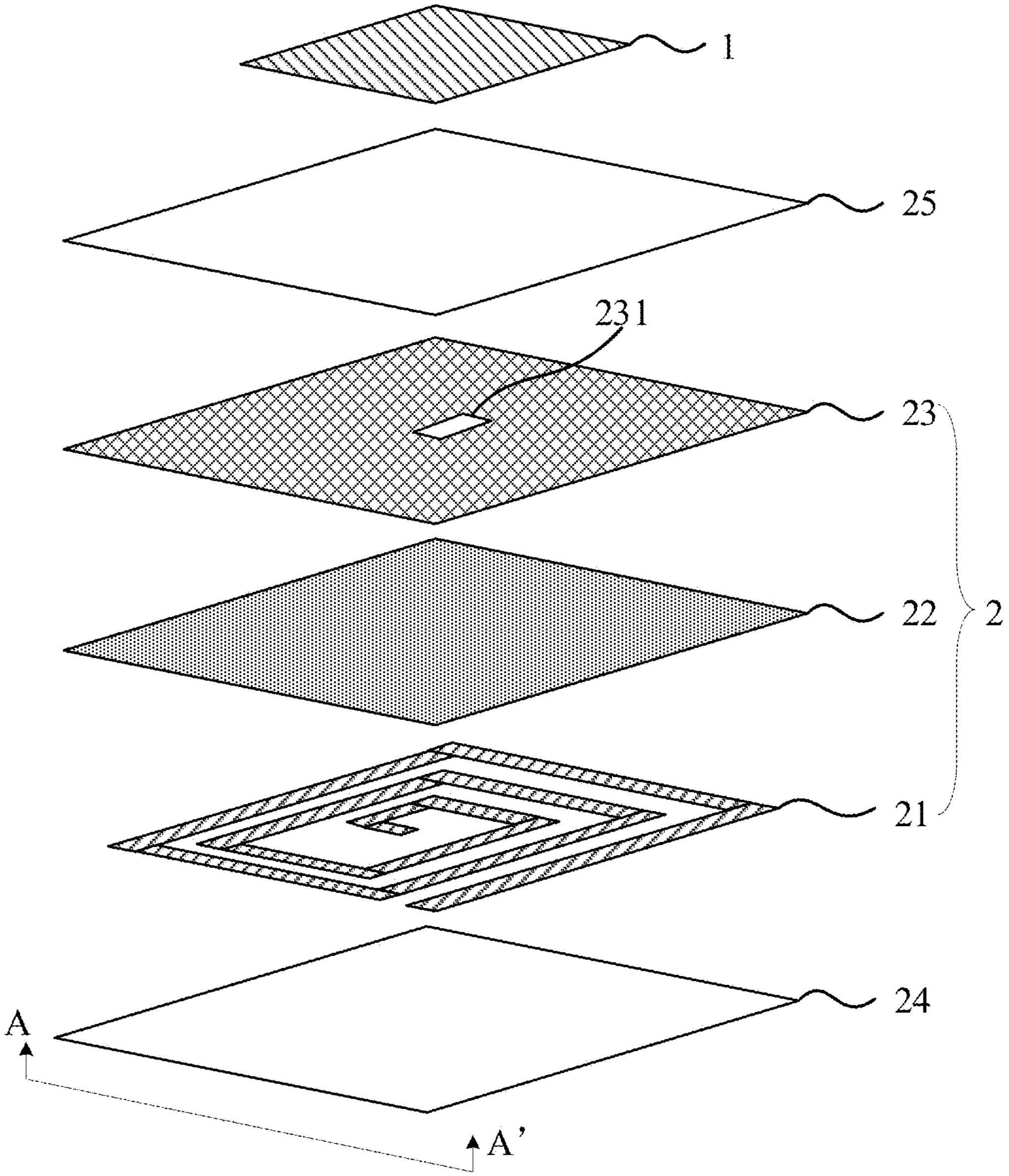
FIG. 2A is a layered structural schematic diagram of an antenna unit according to an example of the disclosure.
Figure 2B:
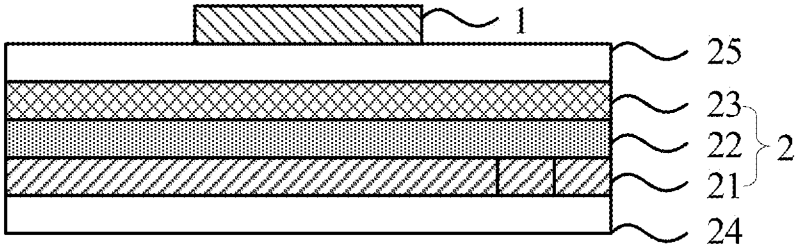
FIG. 2B is a schematic cross-sectional view of the antenna unit shown in FIG. 2A along direction AA'.
Figure 2C:
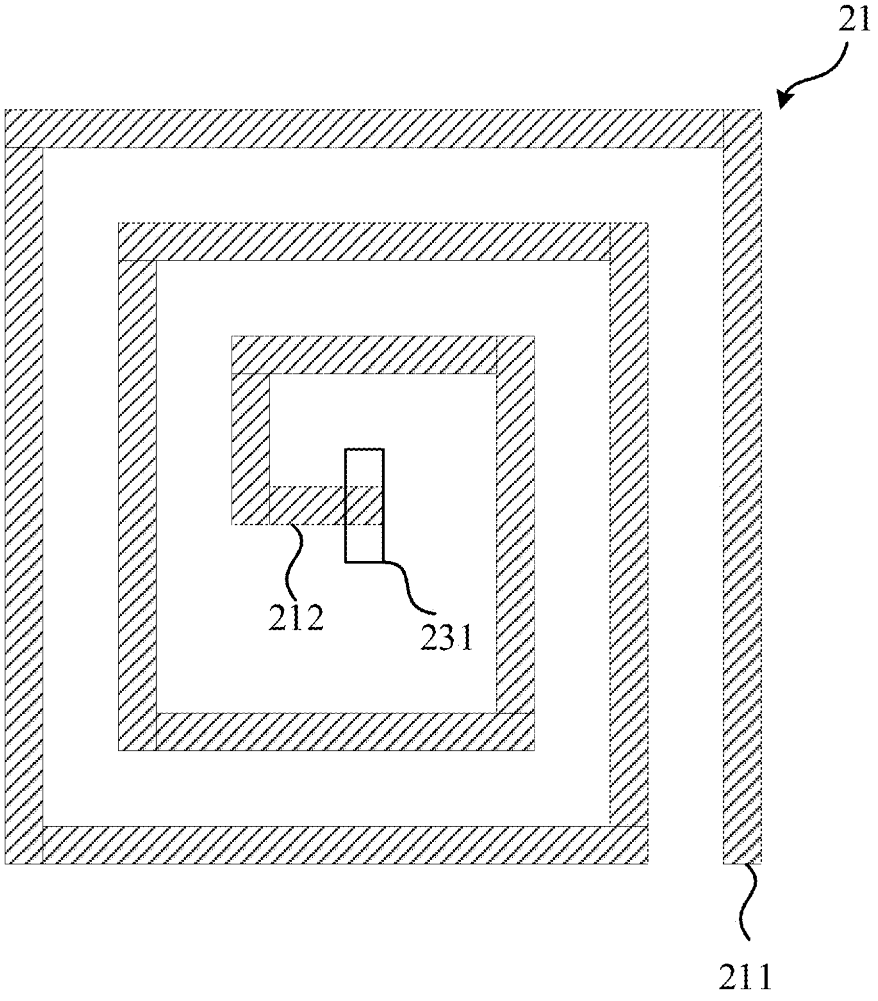
FIG. 2C is a schematic diagram of the relationship between an output end of a microstrip line and a first through hole in the antenna unit shown in FIG. 2A.

FIG. 2A is a layered structural schematic diagram of an antenna unit according to an example of the disclosure. FIG. 2B is a schematic cross-sectional view of the antenna unit shown in FIG. 2A along direction AA'. FIG. 2C is a schematic diagram of the relationship between an output end of a microstrip line and a first through hole in the antenna unit shown in FIG. 2A.

In one example, as shown in FIGS. 2A, 2B, and 2C, the microstrip line is a spiral microstrip line, which may be. For example, in the form of a rectangular spiral as shown in the figure, or may be set to be in the form of a circular spiral as needed.

By arranging the microstrip line accordingly, the length of the microstrip line can be increased as much as possible in a limited area, which is beneficial for the microstrip line to provide appropriate voltage control on one side of the liquid crystal layer to adjust the dielectric constant of the liquid crystal layer, and to ensure the signal quality at the output end of the microstrip line.

In one example, as shown in FIG. 2C, the first through hole 231 is strip-shaped, and the projection of the output end 212 of the microstrip line on the metal layer is perpendicular to the first through hole 231. Accordingly, it is beneficial to ensuring that the output end of the microstrip line is well coupled to the patch antenna via the first through hole.

It needs to be noted that the output end 212 of the microstrip line is not a point, but a segment of microstrip line within a range of the end of the microstrip line; similarly, the input end 211 of the microstrip line is not a point, but a segment of microstrip line within a range of the starting point of the microstrip line.

In one example, the microstrip patch antenna is square in shape. Accordingly, the E-plane and H-plane of the pattern may be symmetrical, to ensure that the emitted signal has good signal quality. Where the size of the microstrip patch antenna may be set as needed. For example, the side length of the microstrip patch antenna is $0.5\lambda_0$, where $\lambda_0$ is the vacuum wavelength corresponding to the working center frequency band of the microstrip patch antenna.

Figure 3:
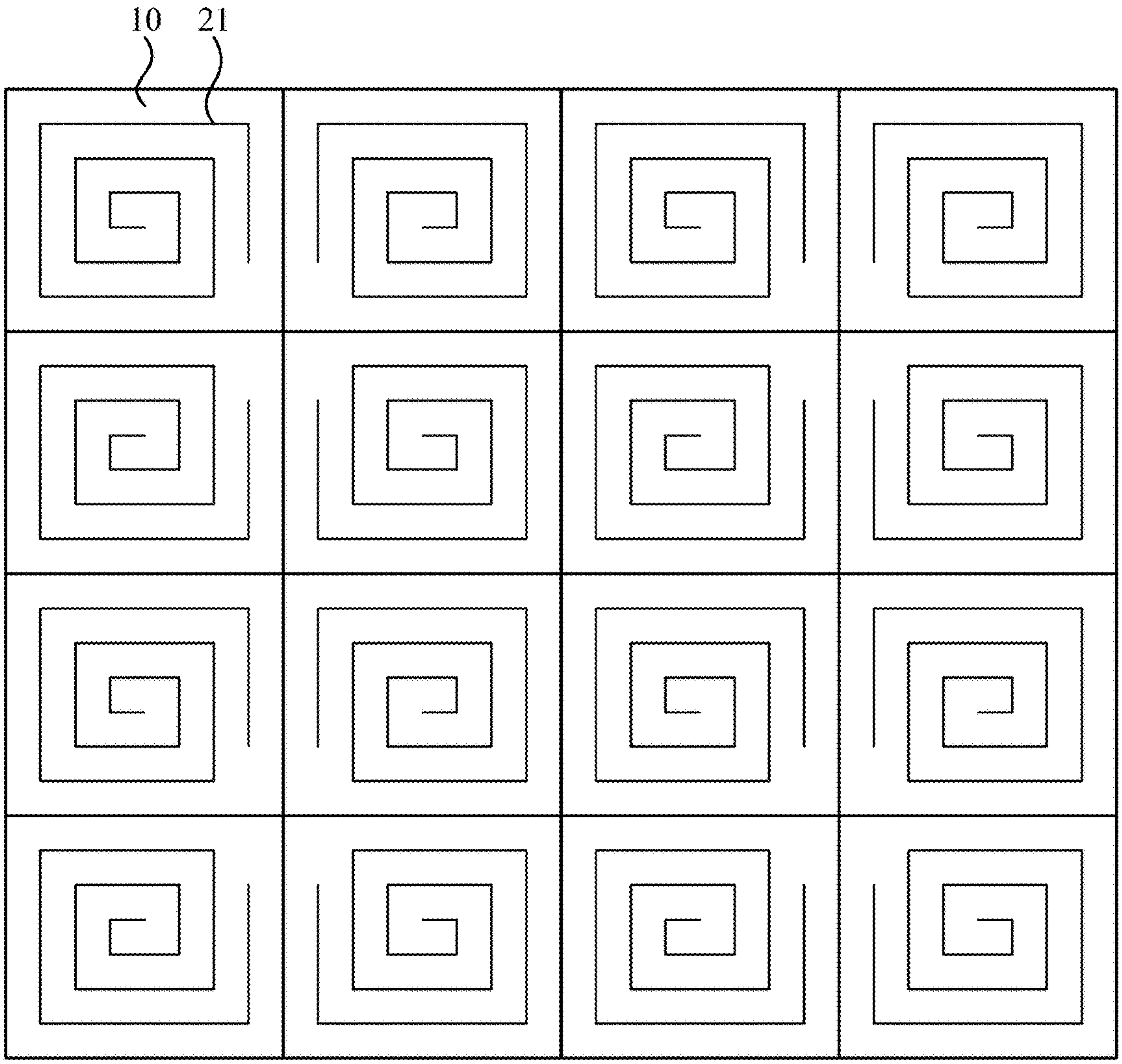
FIG. 3 is a schematic diagram of an antenna array according to an example of the disclosure.

FIG. 3 is a schematic diagram of an antenna array according to an example of the disclosure.

As shown in FIG. 3, the antenna array may include a plurality of antenna units 10 in the above examples. For example, the antenna array may be in a matrix shape as shown in FIG. 3, including 4×4 (i.e., 16) antenna units 10. In other words, the antenna array consists of antenna units arranged in 4 rows and 4 columns. Other shapes of the array, such as 8×8 and 3×3, may also be provided as needed, with a minimum of two antenna units 10.

It needs to be noted that the shapes of the microstrip lines 21 in the antenna units 10 in the antenna array may be set as needed. For example, the shapes may be all set as clockwise spirals, or all set as counterclockwise spirals, or as shown in FIG. 3, partially set as counterclockwise spirals and partially set as clockwise spirals.

Figure 8:
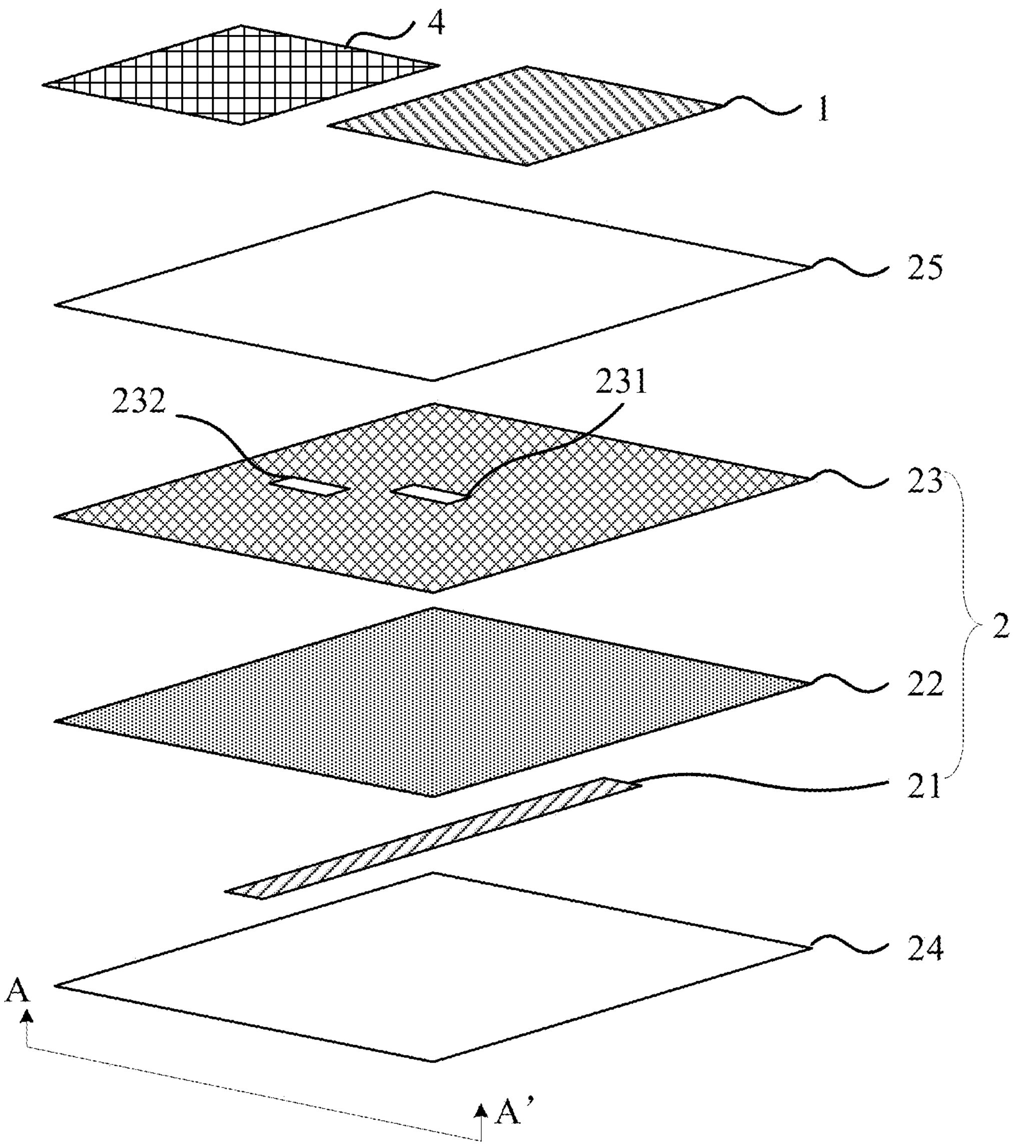
FIG. 8 is a layered structural schematic diagram of an antenna unit according to an example of the disclosure.

In one example, the antenna array further includes a power distribution network 4 as shown in FIG. 8; where the power distribution network 4 includes an input end and a plurality of output ends, the input end of the power distribution network 4 is configured to receive a radio frequency signal, and the output end of the power distribution network 4 is configured to transmit the radio frequency signal to the input end of the microstrip line 21.

The power distribution network 4 may include one input end and a plurality of output ends, the input end of the power distribution network 4 may receive a radio frequency signal from a signal generator (not shown), and then transmit the radio frequency signal to the output end of the power distribution network 4, which in turn may transmit the signal further to the input end of the microstrip line 21, for example through direct connection or through coupling, such as the input end 211 shown in FIG. 2C.

In one example, the power distribution network 4 is located on the same layer as the microstrip patch antenna 1; a second through hole 232 is formed in the metal layer 23, and the output end of the power distribution network 4 and the input end of the microstrip line 21 are coupled via the second through hole 232.

That is, a signal on the power distribution network 4 may be coupled to the input end of the microstrip line 21 via the second through hole 232 through the output end of the power distribution network 4 so that the microstrip line 21 may transmit a corresponding signal. The signal transmission lines in the power distribution network 4 may be composed of microstrip lines.

In one example, the second through hole 232 is strip-shaped, and the projections of the output end of the power distribution network 4 and the input end of the microstrip line 21 on the metal layer 23 are perpendicular to the second through hole 232. Accordingly, it is beneficial to ensure that the output end of the power distribution network 4 is well coupled to the input end of the microstrip line 21.

In one example, the number of the output ends of the power distribution network 4 is less than or equal to the number of the input ends of the microstrip line 21. In one example, each output end of the power distribution network 4 is coupled to a plurality of input ends of the microstrip line 21.

One output end of the power distribution network can transmit signals to the input end of one microstrip line or to the input ends of a plurality of microstrip lines. For example, in the example shown in FIG. 3, the power distribution network may be set to have sixteen output ends, then one output end of the power distribution network can transmit signals to the input end of one microstrip line, or the power distribution network may be set to have eight output ends, then one output end of the power distribution network can transmit signals to the input ends of two microstrip lines.

The following examples are mainly illustrated in the case that the power distribution network has eight output ends.

Figure 4:
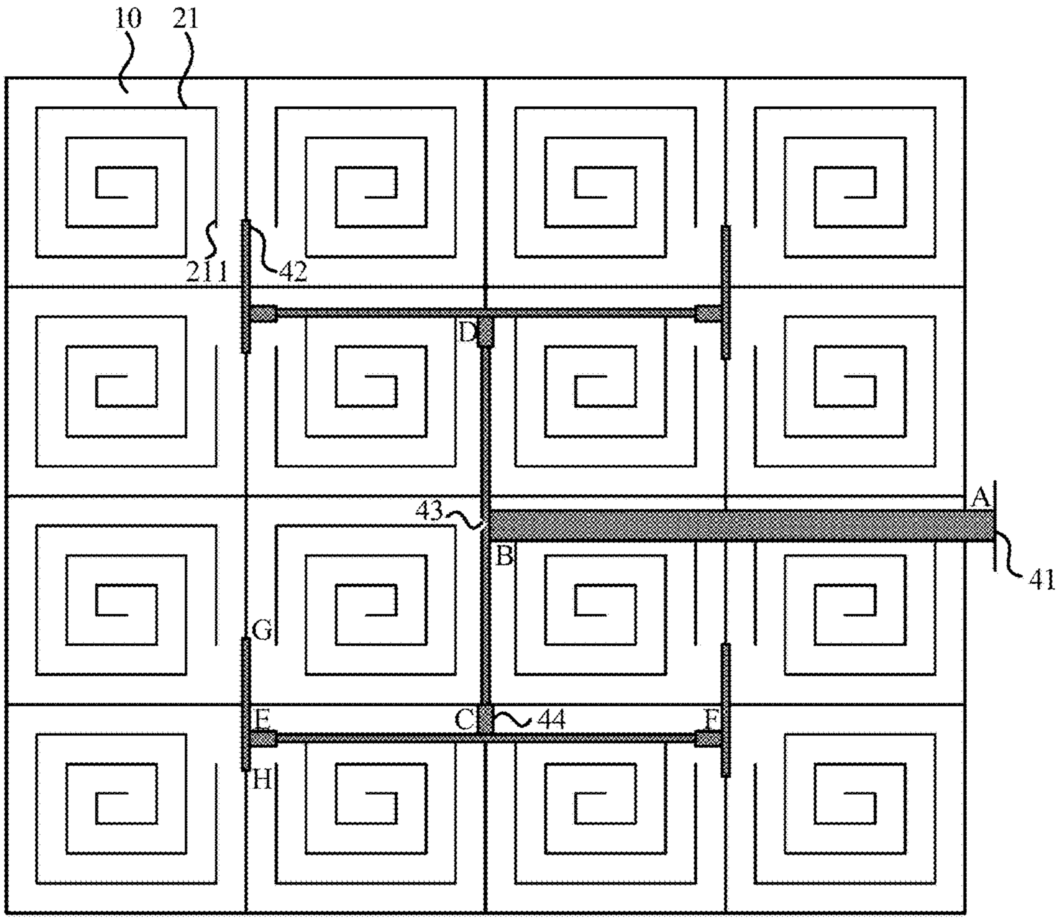
FIG. 4 is a schematic diagram of a power distribution network according to an example of the disclosure.

FIG. 4 is a schematic diagram of a power distribution network according to an example of the disclosure.

In one example, as shown in FIG. 4, on the basis of the antenna array shown in FIG. 3, a power distribution network may be provided. For example, the power distribution network includes one input end 41 and eight output ends 42, with each output end being coupled to the input ends 211 of the microstrip lines of two antenna units. Accordingly, the power distribution network can transmit signals to the microstrip lines of sixteen antenna units.

It needs to be noted that the structure of the power distribution network is not limited to the case described in the above examples, but can be adjusted as needed, for example, according to the structure of the antenna array.

In one example, the signal transmission lines in the power distribution network are designed based on at least one quarter-wavelength impedance matching section. For example, in the example shown in FIG. 4, the power distribution network is a T-shaped network, i.e., a signal transmission line from one node is split into two signal transmission lines, and so on until the needed number of output ends is obtained. The signal transmission lines in the power distribution network may be composed of microstrip lines.

In this case, for example, the impedance of each microstrip line section in the power distribution network may differ. For example, the impedance of the AB section is 50 ohms, the impedance of the CD section is 100 ohms, and the impedance of the EF section is 50 ohms. In order to match the impedances of microstrip lines with different impedances in the power distribution network, this example can adopt two ways.

One way is to set a notch at the intersection of microstrip lines with different impedances in the power distribution network. For example, at the intersection of the AB section and the CD section. For example, as shown in FIG. 4, assume that the AB section and the CD section intersect at the midpoint of the CD section, then a notch 43 may be set at the midpoint of the CD section, which can realize impedance matching to a certain extent.

Another way is to set a matched impedance at the intersection of microstrip lines with different impedances in the power distribution network. For example, in the BC section and the EF section, a matched impedance 44 may be set. The impedance value of the matched impedance 44 may be calculated according to the impedances of the CD section and the EF section. For example, the impedance of the CD section is 100 ohms, and the impedance of the EF section is 50 ohms, so the impedance of the matched impedance 44 is the square root of 50 ohms×100 ohms, which is about 70.7 ohms.

It needs to be noted that in the power distribution network, impedance matching can be realized in any one of the above ways, or in combination of the two ways, which may be set as needed.

By performing the impedance matching design, the energy loss of the power distribution network in the process of transmitting signals can be reduced, and relatively high transmission efficiency can be ensured.

In one example, the distance between microstrip patch antennas in adjacent antenna units is $0.5\lambda_0$ to $\lambda_0$, where $\lambda_0$ is the vacuum wavelength corresponding to the working center frequency band of the microstrip patch antenna.

In the antenna array, since there are a plurality of antenna units, the beam formed by the phase superposition of the signals emitted and radiated from the microstrip patch antennas of the plurality of antenna units will be affected by the distance between the microstrip patch antennas. For example, by taking two adjacent microstrip patch antennas as an example, the longer the distance between microstrip patch antennas, the larger the sidelobe of the beam, and the smaller the distance between microstrip patch antennas, the greater the coupling effect between the units. In order to compromise the coupling strength and sidelobe size, this example sets the distance between microstrip patch antennas in adjacent antenna units to be $0.5\lambda_0$ to $\lambda_0$ to avoid excessive sidelobe or strong coupling.

Figure 5:
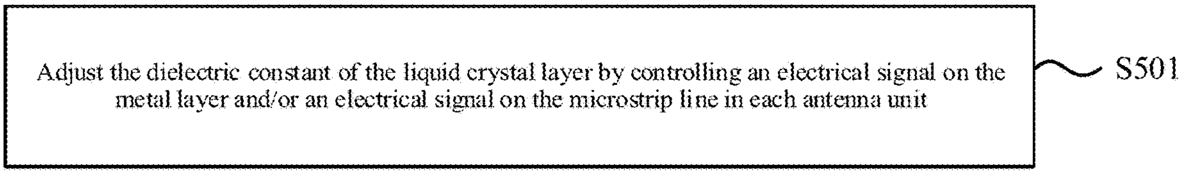
FIG. 5 is a flowchart of a beam scanning method according to an example of the disclosure.

FIG. 5 is a flowchart of a beam scanning method according to an example of the disclosure. The beam scanning method according to this example, may be applied to the antenna array according to any one of the above examples, and may be used to control the antenna array, the antenna array may be applied to a terminal that can communicate with a communication apparatus moving in the air, such as a satellite in a non-terrestrial network, by controlling the antenna array to perform beam scanning.

As shown in FIG. 5, the beam scanning method includes the following steps: S501, adjusting the dielectric constant of the liquid crystal layer by controlling an electrical signal on the metal layer and/or an electrical signal on the microstrip line in each antenna unit; where the electric signal on the microstrip line is phase-shifted by the liquid crystal layer and then coupled to the microstrip patch antenna for radiation, and after the phases of the signals radiated by the microstrip patch antennas in the plurality of antenna units are superimposed, a beam emitted in the target direction is formed.

In one example, the electric signal of the metal layer in the antenna unit can be controlled, or the electric signal on the microstrip line in the antenna unit can be controlled, the electric signals on the metal layer and the microstrip line in the antenna unit can also be controlled to change the voltage difference on both sides of the liquid crystal layer, so that the dielectric constant of the liquid crystal layer located between the metal layer and the microstrip line is changed, so as to achieve the purpose of controlling the dielectric constant of the liquid crystal layer.

Since the output end of the microstrip line in the antenna unit is coupled to the microstrip patch antenna via the first through hole in the metal layer, and the signal transmitted by the output end of the microstrip line needs to pass through the liquid crystal layer in the process of coupling the signal to the microstrip patch antenna, the liquid crystal layer can change the phase of the signal to produce a phase shifting effect, while liquid crystal layers with different dielectric constants can produce different phase shifting effects, so that the phase of the signal coupled to the microstrip patch antenna, i.e., the phase of the signal radiated by the microstrip patch antenna, can be further controlled by controlling the dielectric constant of the liquid crystal layer.

Further, for a plurality of antenna units in an antenna array, the phase of the signal radiated by the microstrip patch antenna in each antenna unit can be controlled as needed, after the phases of the signals radiated by the microstrip patch antennas of the plurality of antenna units are superimposed, a beam transmitted in a target direction can be formed. By controlling the phases of the signals radiated by the microstrip patch antennas of the plurality of antenna units, the target direction can be adjusted. For example, the target direction is aimed at the satellite to communicate with the satellite in a non-terrestrial network.

Since in the example, the antenna array capable of implementing beam phase change is simple in structure, low in manufacturing cost, and small in weight, can be manufactured into a planar structure, and is low in profile, easy to process, easy to downsize, convenient to carry, and convenient to integrate, it is convenient to arrange the antenna array in a terminal for realizing beam scanning.

Figure 6:
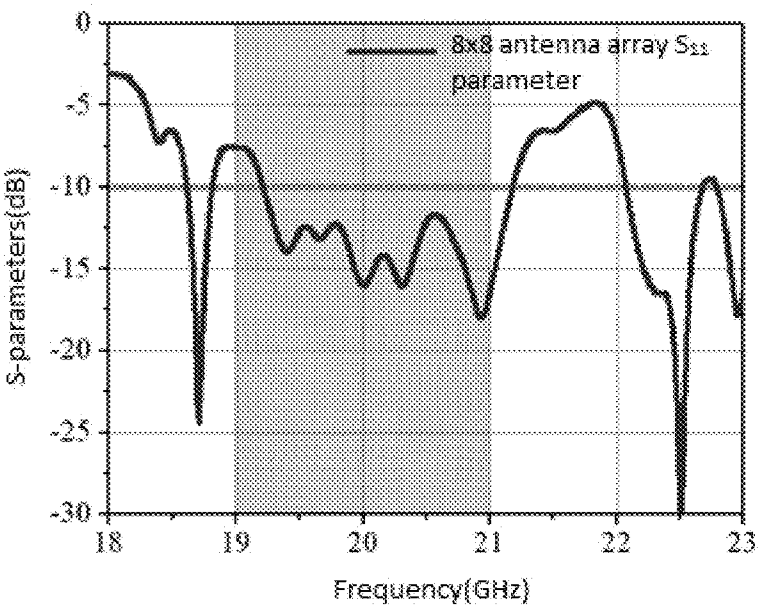
FIG. 6 is a schematic diagram of S-parameters according to an example of the disclosure.

FIG. 6 is a schematic diagram of S-parameters according to an example of the disclosure.

In one example. For example, the antenna array includes 8×8 antenna units. For example, the working frequency is 20 GHz, the relationship between the S-parameters (e.g., S11) and the working frequency band is as shown in FIG. 6, the S-parameters remain below-10 dB in the range of 19.4 GHz to 21 GHz, i.e., the antenna array of this example has good antenna emission efficiency.

According to the example of the disclosure, the direction of the beam emitted by the antenna array is controlled, and the pitch angle of the beam can vary within the range of −30° to +30°. Additionally, the difference of the maximum relative field strength in the radiation pattern within this angle range is within 3 dB, that is, the antenna array has good use effect within this pitch angle range.

Examples of the disclosure further provide a communication apparatus, such as a terminal in the above examples, including an antenna array as described in any of the above examples, and a processor, and a memory for storing a computer program; where, when the computer program is executed by a processor, the beam scanning method in any one of the above examples is implemented.

Examples of the disclosure further provide a computer-readable storage medium for storing a computer program, where the computer program, when executed by a processor, implements the step in the beam scanning method in any one of the above examples.

Figure 7:
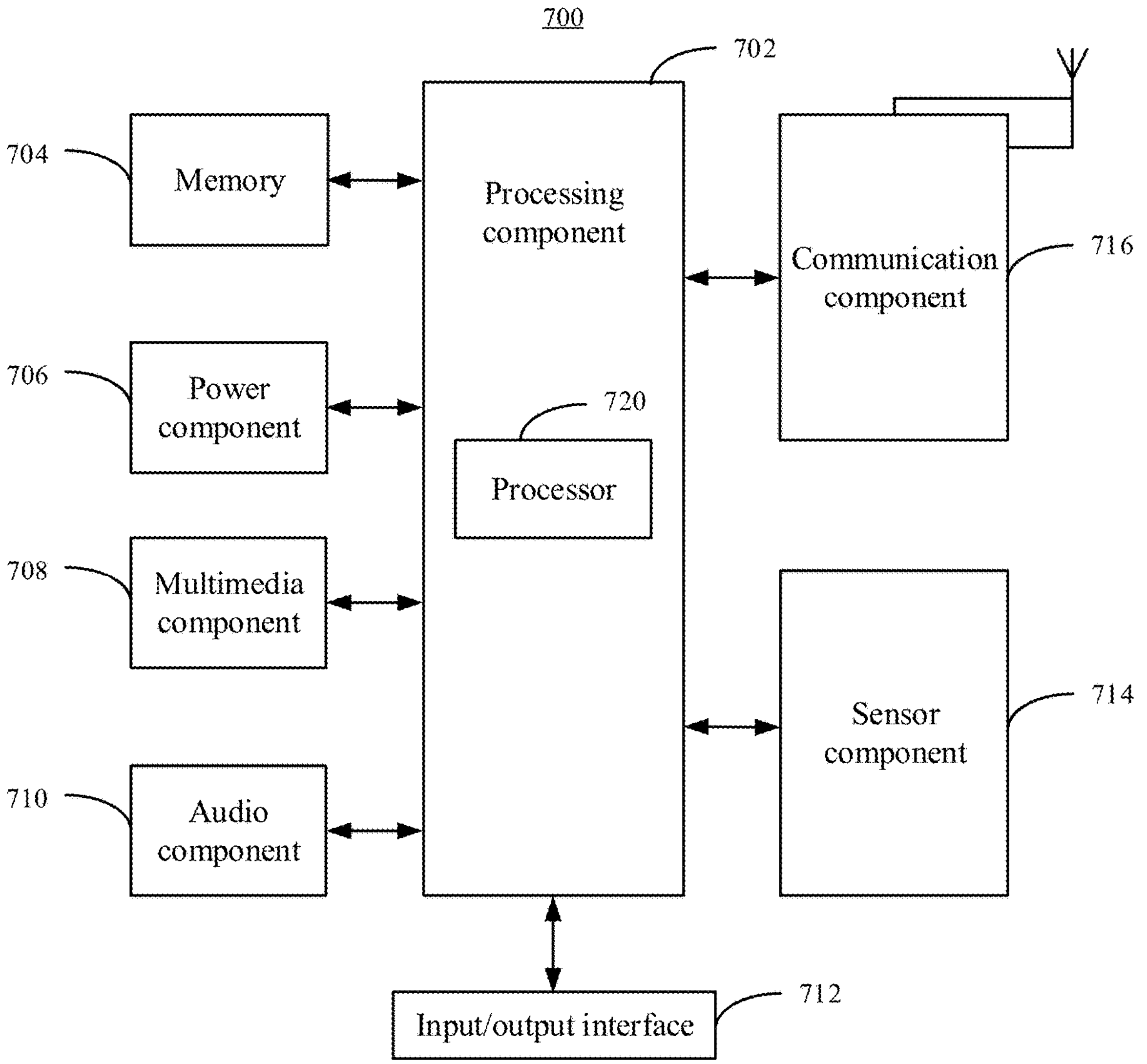
FIG. 7 is a schematic block diagram of an apparatus for beam scanning according to an example of the disclosure.

FIG. 7 is a schematic block diagram of an apparatus 700 for beam scanning according to an example of the disclosure. For example, the apparatus 700 may be a mobile phone, a computer, a digital broadcast terminal, a messaging device, a gaming console, a tablet device, a medical device, a fitness device, a personal digital assistant, or the like.

Referring to FIG. 7, the apparatus 700 may include one or more of a processing component 702, a memory 704, a power component 706, a multimedia component 708, an audio component 710, an input/output (I/O) interface 712, a sensor component 714, and a communication component 716.

The processing component 702 generally controls the overall operation of the apparatus 700, such as operations associated with display, phone call, data communication, camera operation, and recording operation. The processing component 702 may include one or more processors 720 to execute instructions to perform all or a portion of the steps of the methods described above. Additionally, the processing component 702 may include one or more modules that facilitate the interaction between the processing component 702 and other components. For example, the processing component 702 may include a multimedia module to facilitate the interaction between the multimedia component 708 and the processing component 702.

The memory 704 is configured to store various types of data to support the operation of the apparatus 700. Examples of these data include instructions for any application or method operating on the apparatus 700, contact data, phonebook data, messages, pictures, video, etc. The memory 704 may be implemented by any type or combination of volatile or non-volatile storage devices, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 706 provides power for the various components of the apparatus 700. The power component 706 may include a power management system, one or more power sources, and other components associated with generating, managing, and distributing power for the apparatus 700.

The multimedia component 708 includes a screen that provides an output interface between the apparatus 700 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may not only sense the boundary of a touch or swipe action, but also detect the duration and pressure associated with the touch or swipe operation. In some examples, the multimedia component 708 includes a front-mounted camera and/or a rear-mounted camera. When the apparatus 700 is in an operation mode, such as a shooting mode or a video mode, the front-mounted camera and/or the rear-mounted camera may receive external multimedia data. Each front-mounted camera and rear-mounted camera may be a fixed optical lens system or have focal length and optical zoom capability.

The audio component 710 is configured to output and/or input audio signals. For example, the audio component 710 includes a microphone (MIC) configured to receive external audio signals when the apparatus 700 is in an operation mode, such as a call mode, a recording mode, and a voice recognition mode. The received audio signals may be further stored in the memory 704 or transmitted via the communication component 716. In some examples, the audio component 710 further includes a speaker for outputting audio signals.

The I/O interface 712 provides an interface between the processing component 702 and peripheral interface modules, which may be a keyboard, a click wheel, buttons, and the like. These buttons may include, but are not limited to, a home button, a volume button, a start button, and a lock button.

The sensor component 714 includes one or more sensors for providing status assessments of various aspects for the apparatus 700. For example, the sensor component 714 can detect the on/off state of the apparatus 700, the relative position of the components, such as the display and keypad of the apparatus 700, the sensor component 714 may also detect changes in the position of the apparatus 700 or a component of the apparatus 700, the presence or absence of user contact with the apparatus 700, the orientation or acceleration/deceleration of the apparatus 700, and changes in temperature of the apparatus 700. The sensor component 714 may include a proximity sensor configured to detect the presence of a nearby object in the absence of any physical contact. The sensor component 714 may also include an optical sensor, such as a CMOS or CCD image sensor, for use in imaging applications. In some examples, the sensor component 714 may also include an acceleration sensor, a gyro sensor, a magnetic sensor, a pressure sensor, or a temperature sensor.

The communication component 716 is configured to facilitate communication, wired or wirelessly, between the apparatus 700 and other devices. The apparatus 700 may access a wireless network based on a communication standard, such as WiFi, 2G, 3G, 4G LTE, 5G NR, or their combination. In an example, the communication component 716 receives a broadcast signal or broadcast related information from an external broadcast management system via a broadcast channel. In an example, the communication component 716 also includes a near field communication (NFC) module to facilitate short-range communication. For example, the NFC module may be implemented based on radio frequency identification (RFID) technology, infrared data association (IrDA) technology, Ultra-Wideband (UWB) technology, Bluetooth (BT) technology, and other technologies.

In an example, the apparatus 700 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements, for performing the methods described above.

In an example, there is also provided a non-transitory computer-readable storage medium including instructions, e.g., the memory 704 including instructions, which are executable by the processor 720 of the apparatus 700 to perform the method described above. For example, the non-transitory computer-readable storage medium may be an ROM, a random access memory (RAM), a CD-ROM, a magnetic tape, a floppy disk, an optical data storage device, and the like.

Other examples of the disclosure will be apparent to those skilled in the art from consideration of the description and practice of the disclosure disclosed here. The disclosure is intended to cover any variations, uses, or adaptations of the disclosure following the general principles of the disclosure and including common general knowledge or customary practice in the art to which the disclosure is not disclosed. The description and examples are to be merely considered as examples, with a true scope and spirit of the disclosure being indicated by the following claims.

It needs to be understood that the disclosure is not limited to the precise construction that has been described above and illustrated in the accompanying drawings, and that various modifications and changes may be made without departing from the scope. The scope of the disclosure is limited only by the appended claims.

It needs to be noted that in the disclosure, relational terms such as first and second are merely used to distinguish one entity or operation from another entity or operation, and do not necessarily require or imply any such actual relationship or order between these entities or operations. The terms “including”, “comprising” or any other variation are intended to cover non-exclusive inclusion, so that a process, method, article or device including a series of elements includes not only those elements, but also other elements not explicitly listed or elements inherent to such process, method, article or device. Without further restrictions, an element defined by the phrase “including one” does not exclude the existence of other identical elements in the process, method, article or device including the element.

The methods and apparatuses provided by the examples of the disclosure have been described in detail, the principles and examples of the disclosure have been described here using specific examples, the descriptions of the examples are merely used to help understand the methods and core ideas of the disclosure; in the meantime, it will be appreciated by those skilled in the art that various changes may be made to the specific examples and the scope of the disclosure according to the teachings of the disclosure. In view of the above, the contents of the disclosure ought not to be construed as limiting the disclosure.

The invention claimed is:

1. An antenna array, comprising a plurality of antenna units; wherein each of the antenna units comprises a microstrip patch antenna and a phase shifter; wherein the phase shifter comprises:

a microstrip line;

a liquid crystal layer, arranged between the microstrip line and the microstrip patch antenna; and a metal layer, arranged between the liquid crystal layer and the microstrip patch antenna;

a first through hole is formed in the metal layer, and the microstrip patch antenna and an output end of the microstrip line are coupled via the first through hole;

wherein the antenna array further comprises a power distribution network, wherein the power distribution network comprises an input end and a plurality of output ends, wherein the input end of the power distribution network is configured to receive a radio frequency signal, and the output ends of the power distribution network are configured to transmit the radio frequency signal to the input end of the microstrip line;

wherein the power distribution network is located at a same layer as the microstrip patch antenna, wherein a second through hole is formed in the metal layer, and the output ends of the power distribution network and the input end of the microstrip line are coupled via the second through hole; and wherein the second through hole is strip-shaped, and projections of the output end of the power distribution network and the input end of the microstrip line on the metal layer are perpendicular to the second through hole.

2. The antenna array according to claim 1, wherein a number of the output ends of the power distribution network is less than or equal to a number of the input ends of the microstrip line.

3. The antenna array according to claim 2, wherein each of the output ends of the power distribution network is coupled to a plurality of input ends of the microstrip line.

4. The antenna array according to claim 1, wherein a distance between respective microstrip patch antennas in adjacent antenna units is $0.5\lambda_0$ to $\lambda_0$, wherein $\lambda_0$ is a vacuum wavelength corresponding to a working center frequency band of the microstrip patch antenna.

5. The antenna array according to claim 1, comprising 4 rows×4 columns of the antenna units.

6. The antenna array according to claim 1, wherein the first through hole is strip-shaped, and a projection of the output end of the microstrip line on the metal layer is perpendicular to the first through hole.

7. The antenna array according to claim 1, wherein each of the antenna units further comprises:

a substrate, wherein the microstrip line is arranged on the substrate; and a dielectric layer, arranged between the metal layer and the microstrip patch antenna.

8. The antenna array according to claim 1, wherein the microstrip line is a spiral microstrip line.

9. The antenna array according to claim 1, wherein the microstrip patch antenna is square in shape.

10. The antenna array according to claim 1, wherein impedances of microstrip lines with different impedances in the power distribution network are matched by setting a notch at an intersection of the microstrip lines with different impedances in the power distribution network and/or by setting a matched impedance at the intersection of the microstrip lines with different impedances in the power distribution network.

11. A beam scanning method, applicable to an antenna array comprising a plurality of antenna units; wherein each of the antenna units comprises a microstrip patch antenna and a phase shifter; wherein the phase shifter comprises:

a microstrip line;

a liquid crystal layer, arranged between the microstrip line and the microstrip patch antenna; and a metal layer, arranged between the liquid crystal layer and the microstrip patch antenna;

a first through hole is formed in the metal layer, and the microstrip patch antenna and an output end of the microstrip line are coupled via the first through hole;

wherein the antenna array further comprises a power distribution network, wherein the power distribution network comprises an input end and a plurality of output ends, wherein the input end of the power distribution network is configured to receive a radio frequency signal, and the output ends of the power distribution network are configured to transmit the radio frequency signal to the input end of the microstrip line;

wherein the power distribution network is located at a same layer as the microstrip patch antenna, wherein a second through hole is formed in the metal layer, and the output ends of the power distribution network and the input end of the microstrip line are coupled via the second through hole;

wherein the second through hole is strip-shaped, and projections of the output end of the power distribution network and the input end of the microstrip line on the metal layer are perpendicular to the second through hole;

wherein the beam scanning method comprises:

adjusting a dielectric constant of the liquid crystal layer by controlling an electrical signal on the metal layer and/or the electrical signal on the microstrip line in each of the antenna units; and wherein the electric signal on the microstrip line is phase-shifted by the liquid crystal layer and then coupled to the microstrip patch antenna for radiation, and after phases of the electrical signal radiated by the microstrip patch antennas in the plurality of antenna units are superimposed, a beam emitted in a target direction is formed.

12. A communication device, comprising:

an antenna array, and a processor, and a memory configured to store a computer program; wherein the antenna array comprises a plurality of antenna units, wherein each of the antenna units comprises a microstrip patch antenna and a phase shifter; wherein the phase shifter comprises:

a microstrip line;

a liquid crystal layer, arranged between the microstrip line and the microstrip patch antenna; and a metal layer, arranged between the liquid crystal layer and the microstrip patch antenna;

a first through hole is formed in the metal layer, and the microstrip patch antenna and the output end of the microstrip line are coupled via the first through hole;

wherein the antenna array further comprises a power distribution network, wherein the power distribution network comprises an input end and a plurality of output ends, wherein the input end of the power distribution network is configured to receive a radio frequency signal, and the output ends of the power distribution network are configured to transmit the radio frequency signal to the input end of the microstrip line;

wherein the power distribution network is located at a same layer as the microstrip patch antenna, wherein a second through hole is formed in the metal layer, and the output ends of the power distribution network and the input end of the microstrip line are coupled via the second through hole;

wherein the second through hole is strip-shaped, and projections of the output end of the power distribution network and the input end of the microstrip line on the metal layer are perpendicular to the second through hole; and wherein the computer program, when executed by the processor, implements the beam scanning method according to claim 11.

13. A non-transitory computer-readable storage medium storing a computer program, wherein the computer program, when executed by a processor, implements the beam scanning method according to claim 11.

* * * * *